US007917380B2

(12) United States Patent
Kumar et al.

(10) Patent No.: US 7,917,380 B2
(45) Date of Patent: Mar. 29, 2011

(54) SYSTEM AND METHOD FOR STRATEGIC BUDGETING OF INITIAL RESPONSE FOR MANAGING WILDFIRES

(75) Inventors: Tarun Kumar, Ossining, NY (US); Gyana Ranjan Parija, Haryana (IN); Haifeng Xi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/058,098

(22) Filed: Mar. 28, 2008

(65) Prior Publication Data
US 2008/0178178 A1 Jul. 24, 2008

Related U.S. Application Data

(63) Continuation of application No. 11/035,931, filed on Jan. 14, 2005, now abandoned.

(51) Int. Cl.
*G06F 9/44* (2006.01)
(52) U.S. Cl. .................................. 705/7; 705/8
(58) Field of Classification Search .................. 705/7, 8
See application file for complete search history.

(56) References Cited

U.S. PATENT DOCUMENTS

| | | | | |
|---|---|---|---|---|
| 4,744,026 A | * | 5/1988 | Vanderbei | 705/8 |
| 4,807,108 A | * | 2/1989 | Ben-Arieh et al. | 700/28 |
| 4,885,686 A | * | 12/1989 | Vanderbei | 700/99 |
| 4,924,386 A | * | 5/1990 | Freedman et al. | 705/8 |
| 5,077,661 A | * | 12/1991 | Jain et al. | 700/99 |
| 5,148,365 A | * | 9/1992 | Dembo | 705/36 R |
| 5,216,593 A | * | 6/1993 | Dietrich et al. | 345/467 |
| 5,255,181 A | * | 10/1993 | Chapman et al. | 705/8 |
| 5,289,370 A | * | 2/1994 | Lirov | 705/8 |
| 5,343,388 A | * | 8/1994 | Wedelin | 705/8 |
| 5,404,516 A | * | 4/1995 | Georgiades et al. | 718/104 |
| 5,408,663 A | * | 4/1995 | Miller | 718/104 |
| 5,467,268 A | * | 11/1995 | Sisley et al. | 705/9 |
| 5,649,113 A | * | 7/1997 | Zhu et al. | 705/7 |
| 5,963,911 A | * | 10/1999 | Walker et al. | 705/7 |
| 6,032,123 A | * | 2/2000 | Jameson | 705/8 |
| 6,049,774 A | * | 4/2000 | Roy | 705/8 |
| 6,219,649 B1 | * | 4/2001 | Jameson | 705/8 |
| 6,574,605 B1 | * | 6/2003 | Sanders et al. | 705/8 |

(Continued)

OTHER PUBLICATIONS

Chi et al. (Sung-Do Chi, Ye-Hwan Lim, Jong-Keun Lee, Jang-Se Lee,Soo-Chan Hwang, and Byung-Heum Song "A Simulation-Based Decision Support System for Forest Fire Fighting"; A. Cappelli and F. Turini (Eds.): AI IA 2003, LNAI 2829, pp. 487-499, 2003.c Springer-Verlag Berlin Heidelberg 2003).*

(Continued)

*Primary Examiner* — Lynda C Jasmin
*Assistant Examiner* — Alan Miller
(74) *Attorney, Agent, or Firm* — Whitham, Curtis, Christofferson & Cook, P.C.; Stephen C. Kaufman

(57) ABSTRACT

The present invention provides a system and method for strategic budgeting of initial response for managing wildfires. According to the present invention, stochastic-integer-programming-based constrained optimization techniques are employed to develop a strategic budget by optimally allocating disaster management resources to disaster events belonging to scenarios associated with occurrence probabilities. According to the invention, certain machine-readable data describing fires may be subjected to computerized data processing, ultimately producing a determination of valid disaster management resources for each fire event, which may be used for strategic budgeting of initial responses for managing wildfires.

16 Claims, 2 Drawing Sheets

U.S. PATENT DOCUMENTS

| | | | | |
|---|---|---|---|---|
| 6,625,577 | B1 * | 9/2003 | Jameson | 705/8 |
| 6,965,867 | B1 * | 11/2005 | Jameson | 705/8 |
| 7,249,120 | B2 * | 7/2007 | Bruno et al. | 1/1 |
| 2003/0033180 | A1 * | 2/2003 | Shekar et al. | 705/7 |
| 2003/0216951 | A1 * | 11/2003 | Ginis et al. | 705/8 |
| 2004/0059621 | A1 * | 3/2004 | Jameson | 705/8 |
| 2005/0246039 | A1 * | 11/2005 | Iino et al. | 700/29 |

OTHER PUBLICATIONS

Fiorucci et al. (Paolo Fiorucci, Francesco Gaetani, Ricardo Minciardi "Dynamic Models for Preventive Management and Real Time Control of Forest Fires"; Copyright © 2002 IFAC 15th Triennial World Congress, Barcelona, Spain).*

Martin-Fernandez et al. (Martin-Fernandez, Susana; Martinez-Falero, Eugeno; Perez-Gonzalez, J. Manuel; "Optimization of the Resource Management in Fighting Wildfires"; Environmental Management vol. 30, No. 3, pp. 352-364 © Springer-Verlag New York Inc.*

Dononvan et al. (Geoffrey H. Donvan: Douglas B. Rideout "An integer programming model to optimize resource allocation for wildfire containment" Forest Science; Apr. 2003; 49, 2; Research Library p. 331.*

Lee et al. (B.S. Lee, M.E. Alexander, B.C. Hawkes, T.J. Lynham,B.J. Stocks, P. Englefield "Information systems in support of wildland fire management decision making in Canada" Computers and Electronics in Agriculture 37 (2002) 185 /198.*

Zurring et al. (Hans R. Zuuring; Jimmie D. Chew; J. Greg Jones "Sequential Use of Simulation and Optimization in Analysis and Planning" USDA Forest Service Proceedings RMRS-P-17. 2000.*

Donovan et al. (Geoffrey H Donovan; Douglas B Rideout; "A reformulation of the cost plus net value change (C+NVC) model of wildfire economics" Forest Science; Apr. 2003; 49, 2; Research Library p. 318).*

Fiorucci et al. (Paolo Fiorucci, Francesco Gaetani, Riccardo Minciardi "Optimal Regional Partitioning for Wildfire Risk Characterization" CIMA Centro di ricerca Interuniversitario in Monitoraggio Ambientale, Università degli Studi di Genova, via Cadoma,7-17100 Savona, Italy).*

MacGregor (Donald G. MacGregor "An Inventory of Models, Tools, and Computer Applications for Wildland Fire Management"; Dec. 2004.*

Fire Management Today, vol. 64, No. 2. Spring 2004; Forest Service of the U.S. Department of Agriculture, Washington, DC.*

Kirsch et al. (Andrew G. Kirsch, Douglas B. Rideout "Optimizing Initialattack Effectiveness by Using Performance Measures" Systems Analysis in Forest Resources; Proceedings of the 2003 Symposium) discloses weighted area protected.*

Fried et al. (Jeremy S. Fried, J Keith Gilless, James Spero "Analysing initial attack on wildland fires using stochastic simulation" International Journal of Wildland Fire, 2006, 15, 137-146).*

* cited by examiner

SYSTEM AND METHOD FOR STRATEGIC BUDGETING OF INITIAL RESPONSE FOR MANAGING WILDFIRES

CROSS REFERENCE TO RELATED APPLICATION

This application is a continuation of application Ser. No. 11/035,931 filed on Jan. 14, 2005, now abandoned.

BACKGROUND OF THE INVENTION

1. Field of the Invention

The present invention relates to computer-implemented stochastic optimization modeling, and more particularly, to the use of computer-implemented stochastic optimization modeling to solve problems arising in connection with budgeting initial responses for managing wildfires.

2. Background Description

An enterprise charged with the management of wildfires typically confronts multiple scenarios corresponding to representative wild-land fires occurring in different fire planning seasons. Each such scenario is contingent in the sense that wildfire managers are unable to predict wildfires.

Prior art solutions have involved running a large number of simulations of annual fire season scenarios and evaluating (using a predetermined deployment plan) a candidate resource organization against the samples. Such approaches suffer from two types of problems. First, the solution quality is tied to the choice of the initial candidate solution. In addition, the deployment plan does not optimize the use of available resources in the candidate organization. Thus, neither the selection nor the evaluation of the resource organization is guided by the choice of the optimization objective, and hence, any budget developed using such approaches is anything but strategic. As a result, prior art solutions are not fully satisfactory.

SUMMARY OF THE INVENTION

Stochastic optimization refers to the minimization or maximization of a function in the presence of randomness. Stochastic optimization modeling has been recognized as an effective nonlinear optimization tool for various applications, including the solution of operations research and managerial problems. Stochastic optimization modeling has not previously been applied to the strategic budgeting of initial responses for managing wildfires.

An exemplary object of the present invention is to provide a system and method for using computer-implemented stochastic optimization modeling to solve problems arising in connection with budgeting initial responses for managing wildfires.

The present invention addresses shortcomings of prior art solutions by employing stochastic optimization modeling tools to analyze complex fire management scenarios very quickly with fewer computational resources in order to provide optimal strategic budgeting decisions. The present invention thus formulates the problem of analyzing complex fire management scenarios as a two-stage stochastic optimization model which may be solved using a two-phase decomposition approach.

According to the present invention, each scenario includes a set of representative fires, which are grouped together into blocks of fire groups to indicate their simultaneous occurrence. Due to the constraint that each resource can be assigned to only one of the simultaneous fires, there is competition among simultaneous fires for available resources.

Each representative fire differs in its intensity or flame length/burning index, thereby reflecting differences in difficulty of suppression. Fire suppression resources (such as crew, engine, air tanker, helicopter, etc.) extinguish the fires by constructing fire lines around the perimeter of the fire. Successful containment of a fire is achieved if the fire line constructed by the set of resources meets the perimeter of the fire at any time period (time period/containment period refers to the initial attack period, i.e., the first 18 hours after the fire has been detected).

The number of simultaneous fires for a single group, in a reasonable data instance, can be greater than 30, with more than 1,500 resources items available for deployment over eight time periods, resulting in 400 k+0/1 variables. The problem is further compounded by the fact that there can be 100-500 fire groups in each scenario, with varying number of simultaneous fires.

The present invention thus provides a method and a system employing stochastic-integer-programming-based constrained optimization technology to develop strategic budgets for allocation of disaster management resources to disaster events belonging to scenarios, which may include future scenarios, associated with occurrence probabilities. Said method and system employ as input, in a machine-readable data format:

- A list of fire scenarios with unique IDs for each fire planning unit, and their occurrence probabilities;
- A list of fire-groups with unique IDs including simultaneous fires in each scenario for the fire planning unit;
- A list of fire events with unique IDs in each fire-group by fire management unit location, fire intensity level, and sensitivity time period;
- A list of fire events by their respective weights (relative utility in the utility function), burned area cumulative perimeter growth by time period, and burned area cumulative acres growth by time period;
- A list of fire events with valid list of fire-management resources;
- A list of fire-management resources by kind, category and type;
- A list of fire-management resources by station location;
- A list of fire-management resources (such as water-tenders and air-tankers) by their resource dependencies;
- A list of fire-management resources with cumulative line production quantity by time period for each fire; and
- A list of stations with station capacities and expansion penalties.

In addition, said method and system employ data processing in a computer:

- To analyze a strategic utility/benefit metric, weighted acres managed (WAM, defined mathematically as the weighted sum of the acres managed for all fire events as a result of optimal resource deployment at a given budget), under different planning scenarios involving user-selection of stations, their capacities, and resources there-in; and
- To generate, in a machine-readable data format, a utility/benefit optimization model of overall strategic utility/benefit under the different planning scenarios; and
- To solve a stochastic integer program of a utility/benefit optimization model by solving its deterministic equivalent using a 2-phase optimization approach.

Said method and system then produce as output, in a machine readable data format:

A list of fires with their ID, corresponding contained/escaped status, containment time period, deployed resources, and expected utility;

A list of deployed resources by kind, category, type and station location; and

A distribution of the optimal utility function values, weighted acres managed (WAM), by each scenario.

In some embodiments, it may be beneficial to calculate the list of valid disaster management resources for each fire event:

based on the arrival time of each resource relative to the fire-event location and the containment time horizon for each fire and/or based on the nature of the workload for each fire event and the available deployable resources during the containment horizon for each fire.

In some embodiments, the Phase-1 of the 2-Phase optimization approach includes a decomposition crash heuristic and/or the Phase-2 of the 2-Phase optimization approach may include solving the mixed-integer programming model by hot-starting the model with the solution obtained in Phase-1 of the 2-Phase optimization approach.

In some embodiments, lists of valid resources for each fire may be calculated based on lengths of containment horizons for each fire event and available after-arrival time windows for deployed resource and/or based on the inter-resource dependencies of deployable resources.

In some embodiments, the occurrence probability for each fire-scenario may be calculated from historical data.

Examples of advantages of using the present invention instead of alternative solutions include:

The model produces robust optimal decisions in the face of uncertainty; and

The solution approach for the resulting very large scale optimization model instances is time and memory effective, and it scales well with the problem instance size.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
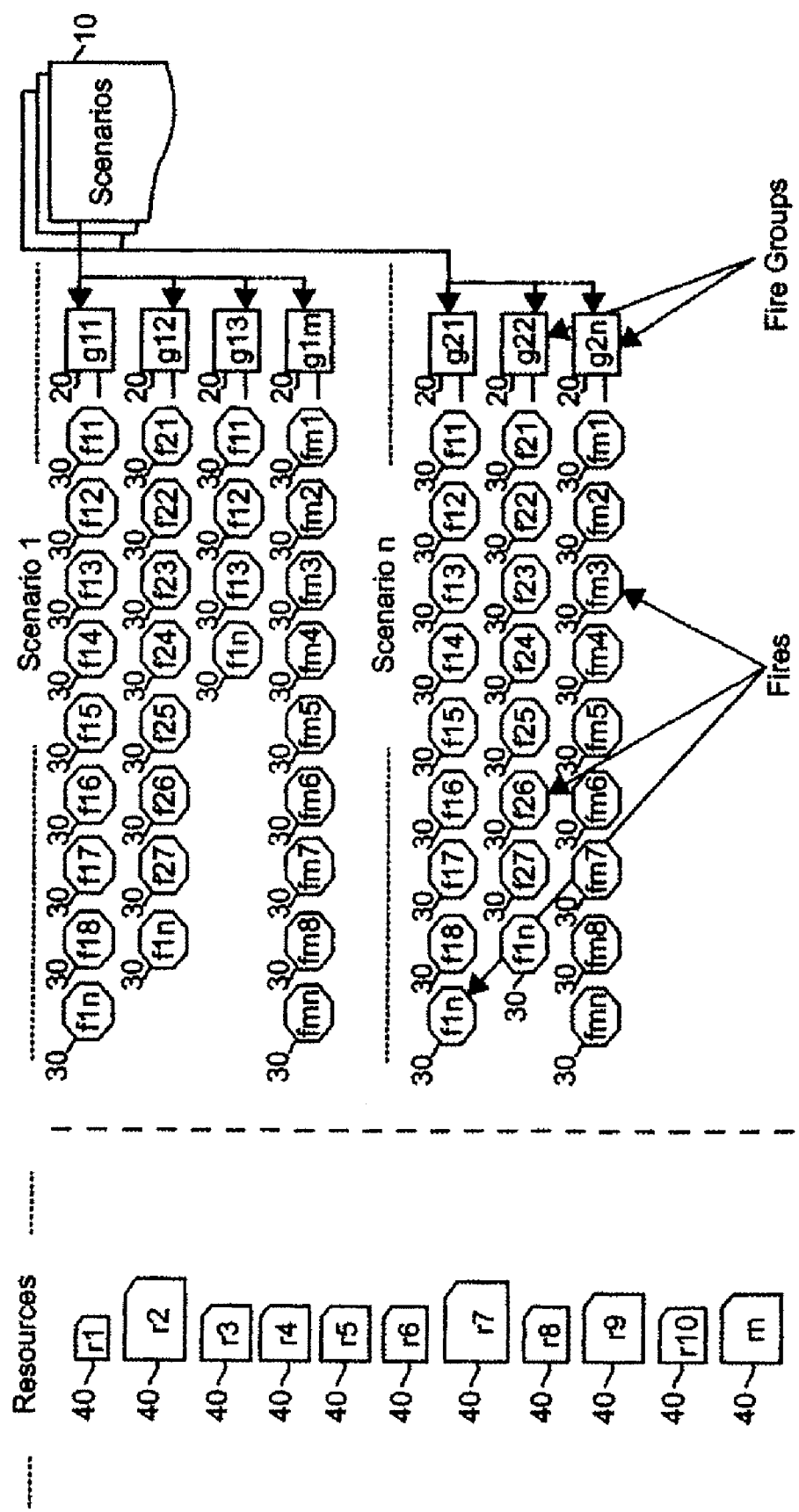
FIG. 1 is a representation of the business problem addressed by the present invention.

Referring now to the drawings, and more particularly to FIG. 1, there is shown scenarios 10 comprised of fire groups 20, each of which is in turn comprised of simultaneously occurring representative fires 30. Also shown are resources 40 which can be assigned to only one of the simultaneous fires, resulting in competition among simultaneous fires for available resources.

Figure 2:
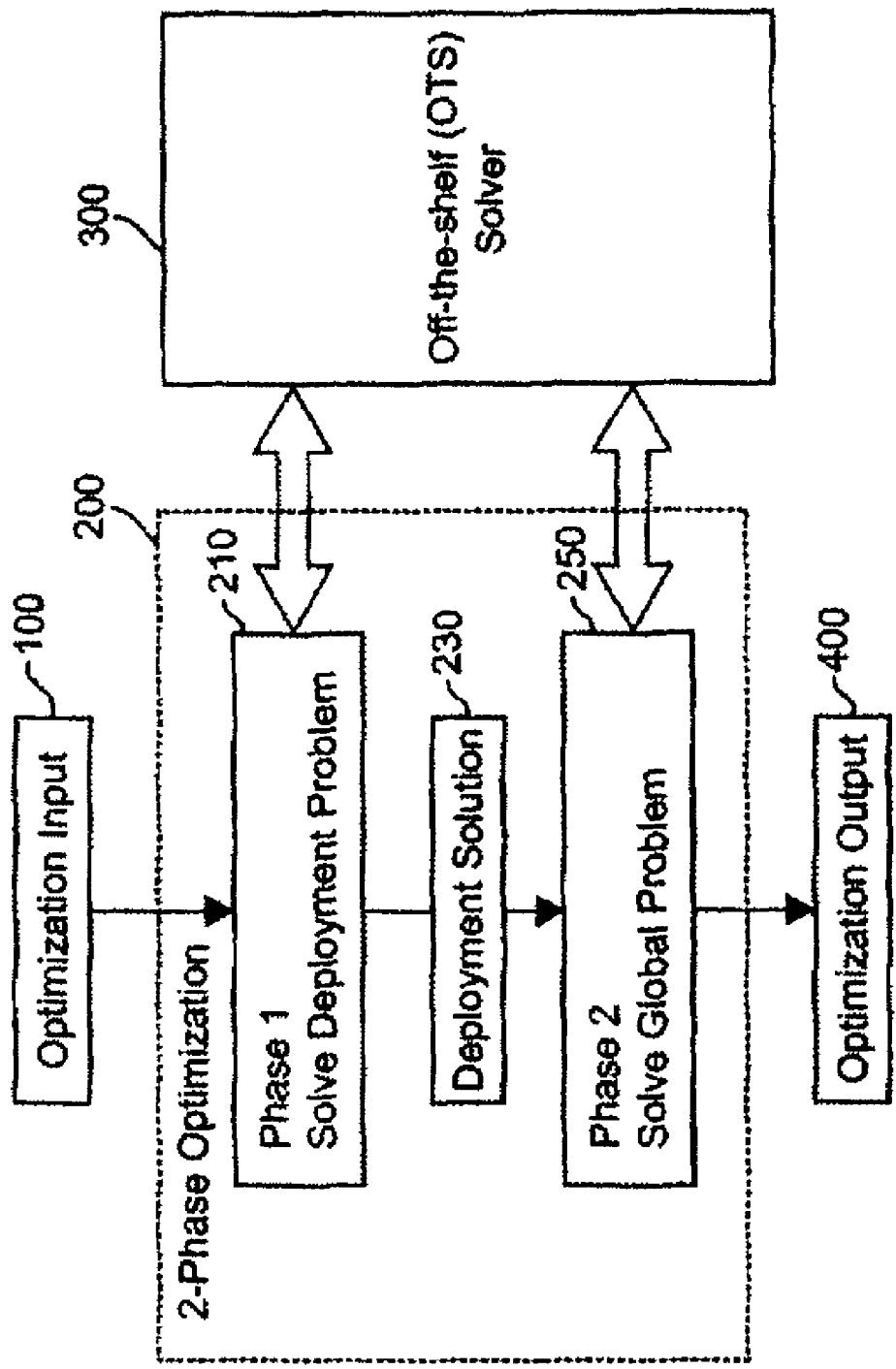
FIG. 2 is a representation of two-stage stochastic integer programming modeling used to solve a strategic budgeting problem using a two-phase decomposition approach according to the present invention.

Referring now to FIG. 2, there is shown a two-phase optimization problem 200 which receives optimization input 100 on which is performed a phase one 210 decomposition using an off-the-shelf problem solver 300 to produce a deployment solution 230, which optimally deploys resources to the fires to discover their resource preferences, and a phase two 250 global problem optimization, which uses said off-the-shelf problem solver 300 to solve the global problem and employs the deployment preference decisions made in phase one to analyze and come up with an optimization output 400 including the optimal initial response resource organization.

The optimization input 100 of FIG. 2 may contain a set of input values required to solve the model. Most notably it may contain data pertaining to:

1. Fires
2. Fire Groups
3. Fire-fighting Resources
4. Costs

Data for each representative fire may contain its perimeter, size (in acres), weight (fire importance, e.g., fires occurring close to urban population have higher weights than those occurring in remote jungles). The optimization input 100 may also contain data pertaining to mop-up cost. A set of simultaneous fires may be grouped together to form a fire group, imposing additional restrictions on deployment of resources and containment of the fires.

Resources may contain deployment and cost data pertaining to each fire they may be deployed on. Each deployable resource on a fire may contain fixed cost (i.e., one time annual cost for procurement of resource), line production capacity (i.e., the capacity of the resource to contain a fire by producing a line using the retardant or land cleanup to contribute to fire containment), hourly cost (i.e., the hazard and overtime pay to the resources—machines and human crew over the deployment period). Various other cost and capacity restrictions may be defined in the input data, e.g., leadership, station and equipment penalty groups that contribute to the total cost.

In order to tackle the business problem, the present invention may allow for the development of a robust optimization engine for analyzing complex fire management scenarios very quickly with fewer computational resources in order to provide optimal strategic budgeting decisions. The present invention may address a two-phase optimization problem 200 using a phase one 210 decomposition as part of a two-phase decomposition approach to dissociate the complexity arising from low-level deployment decisions from the global optimal resource organization. Inherent complexity of the problem may arise from the low-level deployment decisions associated with solving the global model. The deployment decisions may contribute to only approximately 10% of the total cost but approximately 90% of the complexity. Such deployment problems may be dissociated from the global model and may be broken down into a set of smaller sub-problems which may then be tackled. These problems, although still complex, may be relatively small and hence may be solved more quickly.

The deployment solution 230 resulting from the solution of the above-mentioned deployment problem may optimally deploy resources to the fires to discover their resource preferences. These deployment decisions may then form the basis for solving phase two 250 of the problem. Once the global problem is set up using the deployment decisions made in phase one 210, the global problem may present additional challenges due to its tremendous size. An average-sized global model of this type typically has more than 1 million 0/1 variables. A model of this size falls into the category of Very Large Scale Optimization Problem and as such constitutes a "very hard" problem to solve. But the global model is made tractable as a result of the fact that underlying complexity has been tackled upfront in phase one 210. As a result, the global model may be effectively solved in a reasonable time, so that the global model now produces an optimal resource organization that maximizes the weighted acres managed (protected) against the wild land fires under given business and cost constraints. Such a solution meets the functional requirements put forth in the business problem and meets and/or exceeds the non-functional requirements in terms of performance and software and hardware requirements.

An off-the-shelf problem solver 300 is a tool for solving linear optimization problems, commonly referred to as linear programming problems. An off-the-shelf problem solver 300 may also solve a variety of other problems including network flow problems, quadratic programming problems, constrained optimization problems, and so forth. The optimization output 400 represents the solution to the business problem. The solution may comprise of a set of representative resources (air tankers, dozers, crews, helicopters, smoke jumpers etc) that may be deployed to the representative fires to successfully contain them. Also, the solution may contain details about the costs associated with procurement and deployment of resources and any additional costs of containing the fire (e.g.: perimeter mop-up, penalties). The model may be solved iteratively for incrementally higher budget levels to get a frontier that facilitates cost-benefit analysis, cost being the budget and benefit being the weighted acres managed. This may be submitted to the budgeting and planning office for a decision on budget allocation for the relevant fiscal year. This model may be used by the following agencies for strategic budgeting:
1. BLM—Bureau of Land Management
2. NPS—National Park Services
3. FS—Forest Service
4. BIA—Bureau of Indian Affairs
5. USFS—US Fish and Wildlife Services In order to solve the business problem at hand within the software, hardware and performance constraints, the proposed innovation allows the development of a robust optimization engine for analyzing complex fire management scenarios very quickly with fewer computational resources in order to provide optimal strategic budgeting decisions.

In order to handle multiple scenarios corresponding to variable fire season (one year) the problem has been modeled as a two-stage stochastic integer programming model:
  Stage 1: Resource Aquisition Problem
    For an effective and optimal resource organization, efficient and re-usable resources need to be acquired that can be deployed on multiple fires. This is handled in stage 1 of the stochastic integer programming model. The resource selection is based on their cost versus their effectiveness.
  Stage 2: Resource Deployment Problem
    With the efficient resource acquisition made in Stage 1, Stage 2 optimally deploys the resources to each of the fires.

The solution approach used to solve the above problem is a two-phase decomposition approach:
  Phase 1 (Decomposition): Optimal Deployment of Resources
    This phase handles the low level complex decisions associated with deployment of resources to each of the fires in fire groups. The sub-model instances although complex are small in size and can be optimized quickly to discover the resource preference for each of the fires.
  Phase 2: Solve Global Problem
    This phase solves the global problem of creating an optimal resource organization to maximize the weighed acres managed. This phase uses the deployment decision made in Phase 1. The optimization model instance in this phase is very large but simple to solve, as the complexity arising from the deployment decision has been solved in Phase 1.

This two-phase decomposition approach results in a robust optimization model that meets the functional and non-functional requirements and solves the model within s/w, h/w and performance constraints.

In the preferred embodiments, the two-stage stochastic integer programming modeling of the problem of strategic budgeting for wildfires uses scenario-based stochastic modeling. There is a two-stage integer programming model in which stage one is a resource acquisition problem and stage two is a resource deployment problem. The decomposition approach employed to solve the two-phase optimization problem involves a phase one (decomposition), which optimally deploys resources to the fires to discover their resource preferences, and a phase two, solves the global problem and uses the deployment preference decisions made in phase one to analyze and come up with the optimal initial response resource organization.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A computer-implemented, stochastic-integer-programming-based constrained optimization method to develop a strategic budget for allocation of disaster management resources to disaster events belonging to scenarios associated with occurrence probabilities comprising the steps of:
  providing as input, in a machine-readable data format, a list of fire scenarios with unique IDs for each fire planning unit, and their occurrence probabilities;
  providing as input, in a machine-readable data format, a list of fire-groups with unique IDs including simultaneous fires in each scenario for the fire planning unit;
  providing as input, in a machine-readable data format, a list of fire events with unique IDs in each fire-group by one or more of fire management unit location, Fire Intensity Level, and sensitivity time period;
  providing as input, in a machine-readable data format, a list of fire events by one or more of their respective weights (relative utility in the utility function), burned area cumulative perimeter growth by time period, and burned area cumulative acres growth by time period;
  providing as input, in a machine-readable data format, a list of fire events with valid list of fire-management resources;
  providing as input, in a machine-readable data format, a list of fire-management resources by one or more of kind, category and type;
  providing as input, in a machine-readable data format, a list of fire-management resources by station location;
  providing as input, in a machine-readable data format, a list of fire-management resources by their resource dependencies;
  providing as input, in a machine-readable data format, a list of fire-management resources with cumulative line production quantity by time period for each fire;
  providing as input, in a machine-readable data format, a list of stations with station capacities and expansion penalties;
  employing data processing in a computer to analyze strategic utility/benefit (weighted acres managed) under different planning scenarios involving one or more of user-selection of stations, their capacities, and resources there-in; and employing data processing in a computer to generate, in a machine-readable data format, a utility/benefit optimization model of overall strategic utility/benefit under one or more different planning scenarios;

employing data processing in a computer to solve a stochastic integer program of a utility/benefit optimization model by solving its deterministic equivalent using a two-phase optimization approach;

producing as output, in a machine-readable data format, a list of fires with their ID, corresponding contained/escaped status, containment time period, deployed resources, and expected utility;

producing as output, in a machine-readable data format, a list of deployed resources by one or more of kind, category, type and station location;

producing as output, in a machine-readable data format, a distribution of the optimal utility function values, weighted acres managed (WAM), by each scenario.

2. The stochastic integer programming based constrained optimization method recited in claim 1 wherein the list of valid disaster management resources for each fire event is calculated based on the arrival time of each resource relative to the fire-event location and the containment time horizon for each fire.

3. The stochastic integer programming based constrained optimization method recited in claim 2 wherein the lists of valid resources for each fire is calculated based on lengths of containment horizons for each fire event and available after-arrival time windows for deployed resource.

4. The stochastic integer programming based constrained optimization method recited in claim 2 wherein the lists of valid resources for each fire is calculated based on lengths of containment horizons for each fire event and available after-arrival time windows for deployed resource.

5. The stochastic integer programming based constrained optimization method recited in claim 1 wherein the list of valid disaster management resources for each fire event is calculated based on the nature of the workload for each fire event and the available deployable resources during the containment horizon for each fire.

6. The stochastic integer programming based constrained optimization method recited in claim 5 wherein the lists of valid resources for each fire is calculated based on the inter-resource dependencies of deployable resources.

7. The stochastic integer programming based constrained optimization method recited in claim 5 wherein the lists of valid resources for each fire is calculated based on the inter-resource dependencies of deployable resources.

8. The stochastic integer programming based constrained optimization method recited in claim 1 wherein the phase one of the two-phase optimization approach includes a decomposition crash heuristic.

9. The stochastic integer programming based constrained optimization method recited in claim 1 wherein the phase two of the two-phase optimization approach includes solving the mixed-integer programming model by hot-starting the model with the solution obtained in phase one of the two-phase optimization approach.

10. The stochastic-integer-programming-based constrained optimization method recited in claim 1 wherein the occurrence probability for each fire-scenario is calculated from historical data.

11. The stochastic integer programming based constrained optimization method recited in claim 1 wherein the list of valid disaster management resources for each fire event is calculated based on the arrival time of each resource relative to the fire-event location and the containment time horizon for each fire.

12. The stochastic integer programming based constrained optimization method recited in claim 1 wherein the list of valid disaster management resources for each fire event is calculated based on the nature of the workload for each fire event and the available deployable resources during the containment horizon for each fire.

13. The stochastic integer programming based constrained optimization method recited in claim 1 wherein the phase one of the two-phase optimization approach includes a decomposition crash heuristic.

14. The stochastic integer programming based constrained optimization method recited in claim 1 wherein the phase two of the two-phase optimization approach includes solving the mixed-integer programming model by hot-starting the model with the solution obtained in phase one of the two-phase optimization approach.

15. The stochastic integer programming based constrained optimization method recited in claim 1 wherein the occurrence probability for each fire-scenario is calculated from historical data.

16. A system employing stochastic-integer-programming-based constrained optimization technology for developing a strategic budget for allocation of disaster management resources to disaster events belonging to scenarios associated with occurrence probabilities comprising:

means for providing as input, in a machine-readable data format, a list of fire scenarios with unique IDs for each fire planning unit, and their occurrence probabilities;

means for providing as input, in a machine-readable data format, a list of fire-groups with unique IDs including simultaneous fires in each scenario for the fire planning unit;

means for providing as input, in a machine-readable data format, a list of fire events with unique IDs in each fire-group by one or more of fire management unit location, fire intensity level, and sensitivity time period;

means for providing as input, in a machine-readable data format, a list of fire events by one or more of their respective weights (relative utility in the utility function), burned area cumulative perimeter growth by time period, and burned area cumulative acres growth by time period;

means for providing as input, in a machine-readable data format, a list of fire events with valid list of fire-management resources;

means for providing as input, in a machine-readable data format, a list of fire-management resources by one or more of kind, category and type;

means for providing as input, in a machine-readable data format, a list of fire-management resources by station location;

means for providing as input, in a machine-readable data format, a list of fire-management resources by their resource dependencies;

means for providing as input, in a machine-readable data format, a list of fire-management resources with cumulative line production quantity by time period for each fire;

means for providing as input, in a machine-readable data format, a list of stations with station capacities and expansion penalties;

means for employing data processing in a computer to analyze strategic utility/benefit (weighted acres managed) under different planning scenarios involving one or more of user-selection of stations, their capacities, and resources there-in; and means for employing data processing in a computer to generate, in a machine-readable data format, a utility/benefit optimization model of overall strategic utility/benefit under one or more different planning scenarios;

means for employing data processing in a computer to solve a stochastic integer program of a utility/benefit optimization model by solving its deterministic equivalent using a two-phase optimization approach;

means for producing as output, in a machine-readable data format, a list of fires with their ID, corresponding contained/escaped status, containment time period, deployed resources, and expected utility;

means for producing as output, in a machine-readable data format, a list of deployed resources by one or more of kind, category, type and station location;

means for producing as output, in a machine-readable data format, a distribution of the optimal utility function values, weighted acres managed (WAM), by each scenario.

* * * * *